United States Patent
Hui et al.

(10) Patent No.: US 7,412,238 B2
(45) Date of Patent: Aug. 12, 2008

(54) BLIND DETECTION OF PACKET DATA CONTROL CHANNEL

(75) Inventors: Yan Hui, San Diego, CA (US); Ramakrishna Akella, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1060 days.

(21) Appl. No.: 10/603,353

(22) Filed: Jun. 25, 2003

(65) Prior Publication Data

US 2004/0266429 A1    Dec. 30, 2004

(51) Int. Cl.
*H04Q 7/20* (2006.01)
(52) U.S. Cl. ............... 455/434; 455/550.1; 370/913
(58) Field of Classification Search .............. 455/101, 455/343, 403, 572, 574, 522, 434, 550.1; 370/252, 342, 344–345, 335–338, 913
See application file for complete search history.

(56) References Cited

U.S. PATENT DOCUMENTS

| | | | |
|---|---|---|---|
| 6,288,748 B1 * | 9/2001 | Watanabe et al. | 348/511 |
| 6,728,296 B1 * | 4/2004 | Yung | 375/141 |
| 2003/0119452 A1 * | 6/2003 | Kim et al. | 455/69 |
| 2003/0227875 A1 * | 12/2003 | Wei et al. | 370/252 |
| 2004/0160933 A1 * | 8/2004 | Odenwalder et al. | 370/342 |
| 2005/0003768 A1 * | 1/2005 | Laroia et al. | 455/101 |

* cited by examiner

*Primary Examiner*—Binh K Tieu
(74) *Attorney, Agent, or Firm*—Ronald O. Neerings; Wade J. Brady, III; Frederick J. Telecky, Jr.

(57) ABSTRACT

System and method for efficiently detecting packet format from a control channel. A preferred embodiment comprises the use of a slot counter (for example, slot counter 1310) to count the number of slots received (perhaps at a buffer, such as buffer 1305) since the last successfully demodulated packet. Using the slot counter, the number of demodulation attempts can be reduced. For example, if slot counter is one, then a single slot format decode is attempted. If slot counter is two, then a single and dual slot format decode is attempted. Additionally, channel quality can be used to determine likely channel formats. Furthermore, when multiple control channels are used, decoding information regarding one control channel can assist in determining the slot format of another.

27 Claims, 9 Drawing Sheets

BLIND DETECTION OF PACKET DATA CONTROL CHANNEL

TECHNICAL FIELD

The present invention relates generally to a system and method for digital wireless communications, and more particularly to a system and method for efficiently detecting packet format on a control channel.

BACKGROUND

In many modern digital wireless communications systems, such as CDMA2000 (a third generation code-division multiple access (CDMA) based wireless communications system), one or more control channels are used to send control information from a base station (BS) to a mobile station (MS). The information on the control channel(s) may be used to provide information related to data channels, wake-up from a control hold mode, and so forth.

In a CDMA2000 wireless communications system, up to two Forward-Link Packet Data Control Channels (FPDCCH) may be used to send control information to a MS in order to decode a Forward-Link Packet Data Channel (FPDCH) amongst other things. The two FPDCCH channels are code-division multiplexed and is associated with one of two FPDCHs. A single FPDCH is also time-division multiplexed and serves packet data to users. At any given time, each FPDCH can be allocated to one user. The duration of time of a single allocation can be 1, 2, or 4 time slots, with each time slot being 1.25 milliseconds (ms) in duration. The length of a single allocation may be dependent upon many factors, including channel conditions, amount of contention, and so on.

The two FPDCCH channels and the two FPDCH channels match one another in slot format and duration. In other words, if the first FPDCCH is allocated to a user for one time slot, then the second FPDCCH and the two FPDCH channels are also allocated for one time slot. When a number of time slots have been allocated to a particular user, the FPDCH is then populated with user data and the assigned FPDCCH is populated with control information.

A MS needs to continually monitor the FPDCCH in order to ensure that it receives information intended for it. To do so, the MS usually needs to decode both of the FPDCCH channels, read the contents, and determine if data on the associated FPDCH is intended for it. If the MS ID on the FPDCCH matches its own, then the MS attempts to decode the FPDCH.

A straightforward implementation that is commonly used to decode the FPDCCH is to have the MS decode each time slot as if the time slot were part of a one slot, two slot, and four slot allocation format. This decoding is required since the MS has no prior knowledge of the particular format that is being transmitted on the FPDCCH. This implies that, for example, in a four slot allocation example, by the time the MS decodes a fourth time slot and knows for sure that the MS ID of the intended recipient of the FPDCCH and the FPDCH, it had to have decoded the four time slots a total of 12 times (4 time slots*3 decode operations per time slot).

One disadvantage of the prior art is due to the requirement that each time slot be tested for each of the three possible formats, a significant amount of processing power and overhead is expended. For each time slot, two out of the three tests will be shown to be false. Therefore, it takes mobile stations additional processing power in order to perform the testing and at the same time, perform other needed operations. The additional processing power may result in a greater overall cost for the mobile station due to the need for a processing unit with greater capabilities.

A second disadvantage of the prior art is that the additional testing results in the consumption of additional battery power, thereby shortening battery life of a mobile station or requiring a larger battery with greater capacity. This may involve the addition of more weight or the use of more advanced (more expensive) battery technology.

SUMMARY OF THE INVENTION

These and other problems are generally solved or circumvented, and technical advantages are generally achieved, by preferred embodiments of the present invention which provides a system and method for efficiently detecting packet format on a packet data control channel wherein no packet format information is provided on the control channel.

In accordance with a preferred embodiment of the present invention, a method comprising receiving a frame of data, incrementing a frame counter, and demodulating the frame of data based on a value of the frame counter.

In accordance with another preferred embodiment of the present invention, a method for demodulating a control channel, wherein frames of data carried on the control channel may be formatted differently based on channel quality, the method comprising determining a channel quality, and demodulating a frame of data based on the channel quality.

In accordance with another preferred embodiment of the present invention, a circuit comprising a buffer to hold a frame of data from a symbol stream, a frame counter coupled to the buffer, the frame counter to count the number of frames of data held by the buffer since a last successfully demodulated frame of data, and a demodulator coupled to the buffer and the frame counter, the demodulator containing circuitry to demodulate a frame of data using based on the count from the frame counter.

In accordance with another preferred embodiment of the present invention, a wireless receiver comprising a radio frequency (RF) processing unit coupled to a signal input, the RF processing unit containing circuitry to filter, amplify, and mix a signal provided by the signal input, an analog-to-digital converter (ADC) coupled to the RF processing unit, the ADC to convert the filtered, amplified, and mixed signal provided by the RF processing unit into a digital symbol stream, and a digital signal processing unit coupled to the ADC, the digital signal processing unit containing circuitry to demodulate a frame of control data based on a count of a number of frames of control data received since a last successfully demodulated frame of control data and to decode a frame of data based on the demodulated frame of control data.

An advantage of a preferred embodiment of the present invention is the total number of tests of packet format is reduced, therefore the processing power needed from a mobile station's processing unit is reduced, possibly leading to the use of a smaller processing unit.

A further advantage of a preferred embodiment of the present invention is that with the total number of tests of packet format reduced, the overall power consumption of the mobile station may be reduced. Therefore, the mobile station's battery life may be extended or a smaller and less expensive battery may be used.

Yet another advantage of a preferred embodiment of the present invention is that additional hardware is not needed to support the present invention, therefore implementation of the present invention can be inexpensive and quick.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a CDMA2000 digital wireless communications system. An overview of the CDMA2000 technical standard is provided in a document entitled "Introduction to CDMA2000 Spread Spectrum Systems, Release 0," which is herein incorporated by reference. The pertinent section of the CDMA2000 technical standard is specified in a document entitled "Physical Layer Standard for CDMA2000 Spread Spectrum Systems, Release C," which is herein incorporated by reference. The invention may also be applied, however, to other digital wireless communications systems, wherein a control channel supports a variety of frame formats but does not provide indicators as to the actual format being used.

Figure 1:
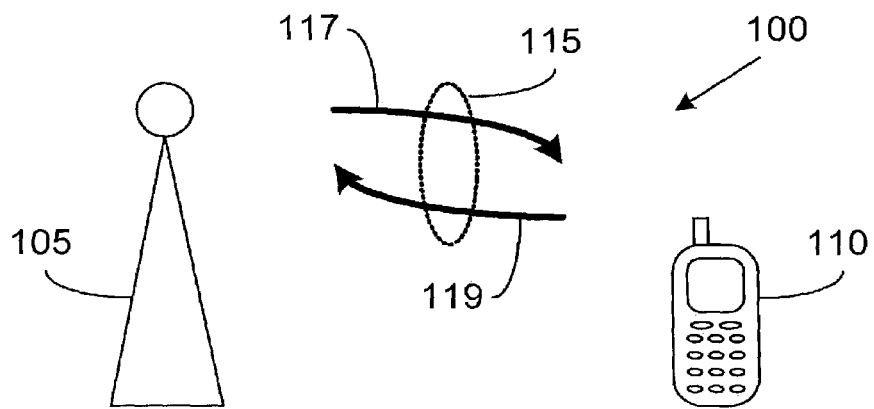
FIG. 1 is a diagram of a portion of a wireless communications system.

With reference now to FIG. 1, there is shown a diagram illustrating a portion of a wireless communications system 100. The portion of the wireless communications system 100 includes a base station (BS) 105 and a mobile station (MS) 110. In a complete wireless communications system, one would expect a larger number of base stations and mobile stations connected wirelessly to the base stations. The mobile station 110 may be as simple as a basic cellular telephone which may serve solely as a voice communications device. Alternatively, the mobile station 110 may be a two-way pager, an enhanced cellular telephone that supports both voice and data applications, a computer (or a personal digital assistant (PDA)) that can use the wireless communications system as a wireless computer network, and so forth.

A wireless connection 115 connects the mobile station 110 to the base station 105. Since the communications between the mobile station 110 and the base station 105 normally requires that data be exchanged between both stations, the wireless connection 115 is typically a two way connection. The wireless connection 115 is made up of a link that carries information from the base station 105 to the mobile station 110 that is commonly referred to as a forward (or downstream) link 117 and a link that carries information from the mobile station 110 to the base station (reverse (or upstream) link 119). Note that while the forward 117 and reverse 119 links are displayed as single links, it is possible that each of the forward 117 and reverse 119 links be made up of several physical or logical channels, including control and data channels. Channels are commonly used to denote individual connections that are used to convey information from a source to a destination.

In many modern wireless communications systems, the forward (downstream) and reverse (upstream) links are dynamic in nature and can adapt to changing data rate requirements. For example, in an existing connection between a base station 105 and a mobile station 110 is being used by the user of the mobile station 110 to browse the Internet and then the user decides to send a large multimedia file to a friend in the form of an email attachment. The browsing of the Internet is a largely asymmetric data exchange that is heavily skewed towards the forward link while the transmission of the email with a large attachment is also an asymmetrical data exchange that is heavily skewed towards the reverse link. It would be quite inefficient to allocate sufficient bandwidth to both applications since doing so would result in a significant amount of bandwidth being unused a significant portion of the time. Therefore, in modern wireless communications systems, additional bandwidth can be added in the form of dynamically increased data rate when the need arises. Bandwidth may be added by allocating additional transmission slots when needed or additional channels may be assigned. When the bandwidth requirement passes, the transmission slots or additional channels may be released, freeing up the bandwidth for other applications and users.

The dynamic nature of the forward and reverse links can make it more difficult on the mobile station when the mobile station is attempting to decode the transmissions to determine if it is the intended recipient of a particular transmission. In a CDMA2000 compliant wireless communications network, for example, there may be up to two Forward-link Packet Data Control Channels (FPDCCH) that can be used to send control information to various mobile stations. The mobile stations use the information in the FPDCCH to decode a Forward-link Packet Data Channel (FPDCH) or to perform other operations, such as waking up from control hold mode, and so forth. Each of the two FPDCCH is associated with a FPDCH. The FPDCH channels are code-division multiplexed and then further time-division multiplexed.

Mobile stations addressed in the FPDCCH are allocated time slots in the FPDCH, in which they are provided data from the base station. The time allocation given to a single mobile station may vary from one, two, or four time slots, with each time slot being 1.25 milliseconds in duration. The time allocation is dependent on several factors, including but not limited to: channel quality, available code space, and so on. A restriction placed on the time slot format in CDMA2000 requires that the two FPDCCH channels and the two FPDCH channels all share the same time slot format at any given time.

Figure 2:
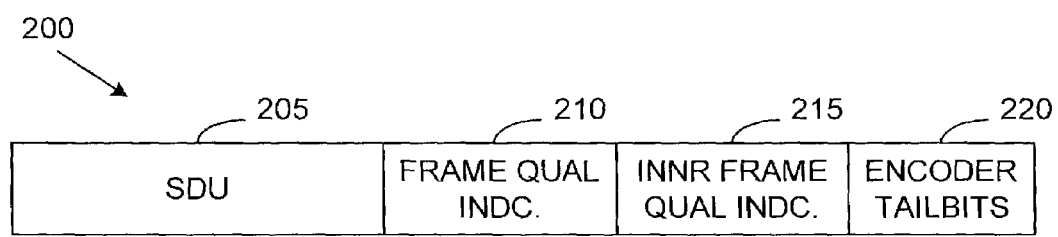
FIG. 2 is a diagram of a frame structure of a forward-link packet data control channel (FPDCCH) in a CDMA2000 wireless communications system.

With reference now to FIG. 2, there is shown a diagram illustrating a frame structure of a frame 200 for a FPDCCH channel in a CDMA2000 wireless communications system. The frame structure of a frame 200 in a FPDCCH channel is as defined in the CDMA2000 technical standards. The frame 200 includes a scrambled data unit (SDU) 205, a frame quality indicator 210, an inner frame quality indicator 215, and an encoder tailbits field 220. The contents of the frame 200 are used to determine important information regarding data in the associated FPDCH channel such as the intended recipient of the data and other addressing and control information. The contents and functions of the frame 200 are described in the CDMA2000 technical standards and are beyond the scope of this specification and will not be described herein. Additionally, a FPDCCH frame does not in itself contain any of the user (or content) data being transmitted from the base station to the mobile station.

Figure 3A:
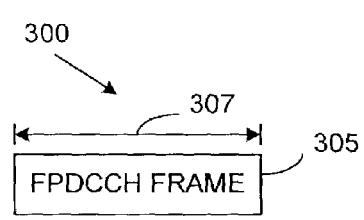
FIGS. 3a through 3c are diagrams of permitted slot formats for a FPDCCH channel.
Figure 3B:
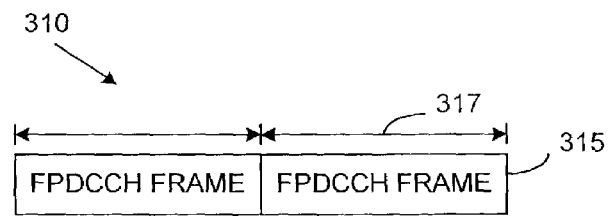
Figure 3C:
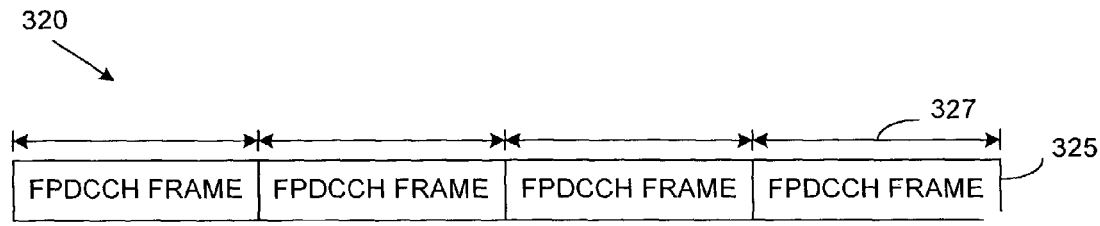

With reference now to FIGS. 3a-3c, there are shown diagrams illustrating permitted slot formats for a FPDCCH channel. FIG. 3a displays a one-slot format 300, while FIG. 3b displays a two-slot format 310 and FIG. 3c displays a four-slot format 320. As their names indicate the one-, two-, and four-slot formats use one, two, or four FPDCCH frames to transmit control and addressing information to an intended recipient. Primary determinants for the use of a particular slot format include channel quality (which places limits on a maximum available data bandwidth), bandwidth contention (demand for data bandwidth by users), user priority (typically users with higher priority will be permitted more data bandwidth), and so forth. Usually, when channel condition permits, the shorter frame formats (such as one- and two-slots) are used. Alternatively, when channel quality is low, then it is normal to see four-slot formats used, since the four-slot offers better protect the transmitted data.

Figure 4:
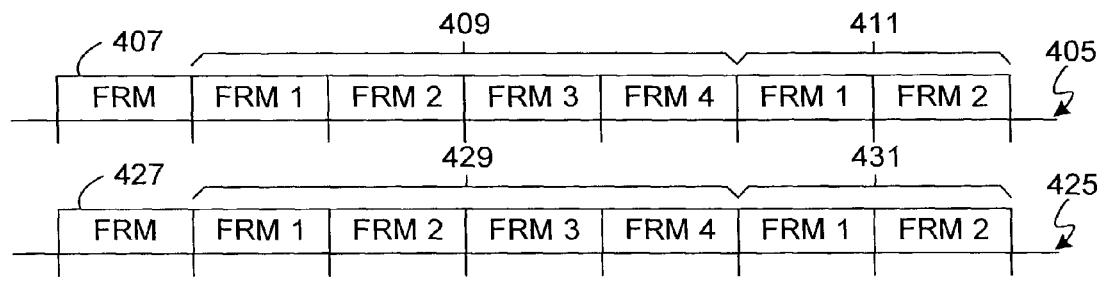
FIG. 4 is a diagram of frames transmitted on two FPDCCH over a period of time.

With reference now to FIG. 4, there is shown a diagram illustrating frames transmitted on two FPDCCH channels 405 and 425 for a period of time. FIG. 4 illustrates several exemplary frames that are transmitted on the two FPDCCH channels 405 and 425 of a single base station for a period of time. Not displayed are two FPDCH channels that are associated with the two FPDCCH channels. In a first time slot of the first FPDCCH channel 405, there is a single FPDCCH frame 407 that is transmitted to a mobile station in a one-slot format. In the next four time slots of the first FPDCCH channel 405, four frames 409 are transmitted to a mobile station in a four-slot format. Finally, two frames 411 are transmitted to a mobile station in a two-slot format.

Note that since the two FPDCCH channels 405 and 425 are required to transmit using the same slot format, there is a corresponding one-slot transmission 427, four-slot transmission 429, and two-slot transmission 431 on the FPDCCH channel 425. However, the transmissions on the FPDCCH channel 425 need not necessarily be to the same mobile stations as the transmissions on the FPDCCH channel 405. Additionally, it is possible that some of the transmissions may be empty if there are no frames to be transmitted. Although, if there are no transmissions, then all of the slots for a single transmission are kept empty.

As discussed previously, a commonly used technique to determine transmission slot format is to test each time slot received against each of the permitted formats. In a CDMA2000 compliant communications system, this would imply that each time slot on a FPDCCH channel is tested with one-, two-, and four-slot transmission formats. Therefore, for each time slot, there are three tests. Additionally, there are two FPDCCH channels therefore a mobile station will need to perform transmission slot format tests a total of six time for every time slot.

Figure 5:
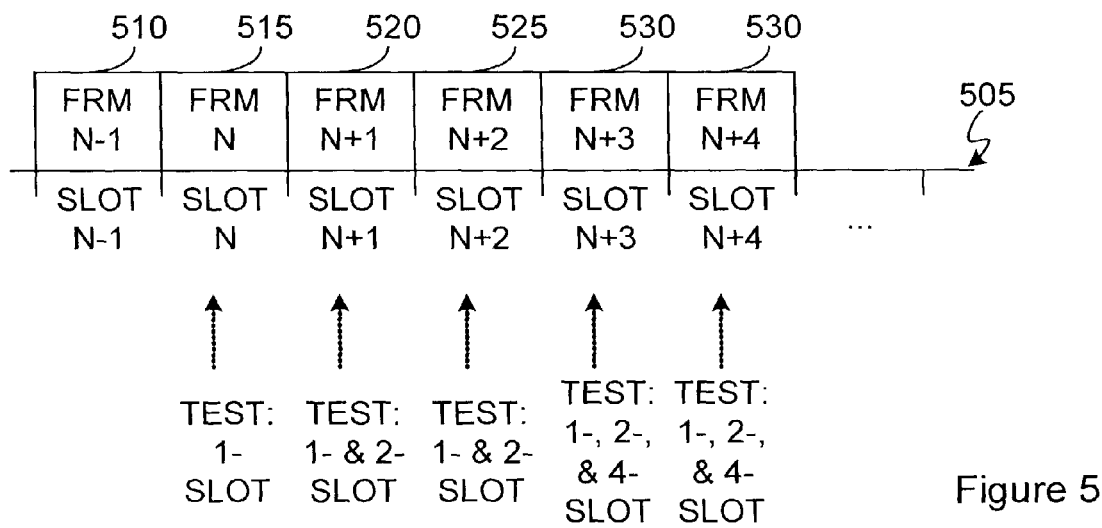
FIG. 5 is a diagram of frames transmitted on a FPDCCH channel over a period of time.

With reference now to FIG. 5, there is shown a diagram illustrating frames transmitted on a FPDCCH channel 505 for a period of time, according to a preferred embodiment of the present invention. FIG. 5 displays an exemplary set of frames transmitted on the FPDCCH channel 505 for a period of six time slots. For illustrative purposes, the time slots are given names, slot N−1 through slot N+4, and the frames transmitted in those time slots are referred to as frames N−1 through frames N+4.

For discussion purposes, assume that frame N−1 transmitted in slot N−1 was the last slot in a successful test. It is not important the particular transmission format, it may have been a one-, two-, or four-slot transmission. With the reception of frame N transmitted in slot N, the commonly used technique would test frame N for one-, two-, and four-slot transmission format. However, since frame N is the first frame received after a successfully decoded transmission, frame N may only be a one-slot transmission formatted frame if it is to be a final frame in a transmission. Therefore, according to a preferred embodiment of the present invention, for the first frame received after a successfully decoded transmission, the only slot format test performed should be a one-slot format test.

Now, assume that frame N was not a one-slot formatted transmission and frame N+1 is received. With frame N not being a one-slot transmission, this implies that frame N+1 may be a second slot of a two-slot transmission or frame N+1 may be the only slot of a one-slot transmission. Since two frames have been received since the last successful transmission, there is not a need to test frame N+1 for a four-slot transmission format. Therefore, according to a preferred embodiment of the present invention, the frame N+1 should be tested for a one- and a two-slot transmission format.

Now assume that frame N+1 was not a one- or two-slot formatted transmission, frame N was not a one-slot formatted transmission and frame N+2 is received. With frame N not being a one-slot transmission and frame N+1 not being a one- or two-slot transmission, this implies that frame N+2 may be a second slot of a two-slot transmission or frame N+2 may be the only slot of a one-slot transmission. Again, since three frames have been received, frame N+2 need not be tested for a four-slot transmission. Therefore, according to a preferred embodiment of the present invention, the frame N+1 should be tested for a one- and a two-slot transmission format.

Now assume that frame N+2 was not a one- or two-slot formatted transmission, frame N+1 was not a one- or two-slot formatted transmission, frame N was not a one-slot formatted transmission and frame N+3 is received. With frame N not being a one-slot transmission and frames N+1 and N+2 not being a one- or two-slot transmission, this implies that frame N+3 may be a fourth slot of a four-slot transmission, frame N+3 may be a second slot of a two-slot transmission, or frame N+3 may be the only slot of a one-slot transmission. Therefore, according to a preferred embodiment of the present invention, the frame N+1 should be tested for a one-, two-, and four-slot transmission format.

If after the reception of frame N+3 and a successful transmission has not been decoded, then frames received after frame N+3, namely frames N+4 and so on, should be tested for one-, two-, and four-slot transmission format. This is to help recover from what is known as "skipping" wherein a mobile station's receiver may miss the reception of a frame that may have been received at other mobile stations. The skipped frame may have been a one-slot transmission or a final frame of a two- or four-slot transmission, thereby completing those particular transmissions. However, since the mobile station missed the frame, it may be an extended amount of time before the mobile station receives another frame of the same transmission slot format. The effects of the skipped frame may be reduced by testing for all possible slot formats after the receipt of frames received after frame N+3 (when frame N−1 was the last successfully transmitted frame of any given slot format), thereby the mobile can recover after the next successful transmission.

Figure 6:
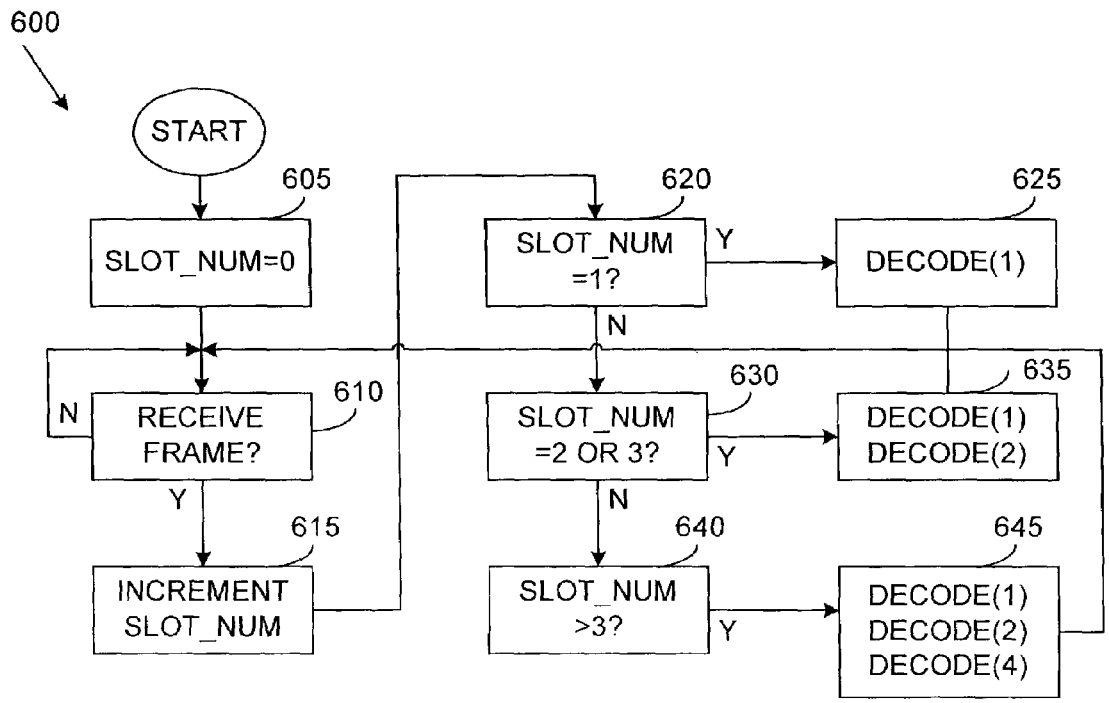
FIG. 6 is a diagram of an algorithm making use of slot counting to help reduce slot format testing, according to a preferred embodiment of the present invention.

With reference now to FIG. 6, there is shown a flow diagram illustrating an algorithm 600 that makes use of slot counting to help reduce slot format testing, according to a preferred embodiment of the present invention. According to a preferred embodiment of the present invention, the algorithm 600 may execute on a processing element or a control unit of a mobile station that is a part of a wireless communications network, such as a CDMA2000 compliant network. The processing element begins by initializing various variables, such as one to keep track of the slot number "SLOT_NUM" (block 605). After initializing variables in block 605, the processing element waits until it receives a frame (block 610). Until it receives a complete frame, the processing element may remain in block 610. Alternatively, the processing element may be performing other tasks and once a complete frame has been received, the processing element may receive an interrupt that notifies it that the mobile station has received a complete frame.

After receiving a complete frame, the processing element increments "SLOT_NUM" by one (block 615) to indicate that it has received a complete frame. The processing element then checks the value of "SLOT_NUM" to determine how it should attempt to decode the completed frame. If "SLOT_NUM" is equal to one (block 620), then the processing element should attempt to decode the completed frame as a one-slot frame format (block 625). If "SLOT_NUM" is equal to either two or three (block 630), then the processing element should attempt to decode the completed frame as a one- or two-slot frame format (block 635). If "SLOT_NUM" is greater than three (block 640), then the processing element should attempt to decode the completed frame as a one-, two-, or four-slot frame format (block 645).

Should any of the decoding operations (blocks 625, 635, or 645) fail to successfully decode the completed frame, the processing element may then return to block 610 to await the arrival of the next completed frame. Note that if a decoding operation is successful in decoding the completed frame, then "SLOT_NUM" is reset to zero and then return to block 610 or rather than returning to block 610, the processing element may return to block 605. The decoding operations are not displayed, but can be derived from the encoding process specified in the technical standards that specify the wireless communications system, such as the CDMA2000 technical standards. The decoding operations are considered well understood by those of ordinary skill in the art of the present invention.

The method of using a slot number counter can be effective in reducing the total number of slot format tests that need to be performed. For example, for the four frames immediately following a frame that was successfully decoded, the total number of slot format tests is reduced from 12 tests (4 frames*3 tests per frame) to 8 tests (1 test for frame N+2 tests from frame N+1+2 tests for frame N+2+3 tests for frame N+3). This is a savings of ⅓ (33 percent).

Slot number counting is one method that can be used to reduce the number of slot format tests that need to be performed. According to the CDMA2000 technical standards, the two FPDCCH channels are required to transmit using the same slot format, i.e., one-, two-, and four-slots. This requirement and probability may be used to help reduce the number of slot format tests.

For analysis purposes, let $p_m$ be the false detection rate for a FPDCCH. The false detection rate is a probability of detecting that a frame is transmitted in a particular format when it is not. For example, detecting that a frame is in a one-slot format when it is in a two-slot format. Also, let $p_d$ be the detection rate (the probability of correctly detecting the format of a frame). This a priori information ($p_m$ and $p_d$) can be use to terminate slot format testing for a completed frame prior to executing all slot format tests.

Figure 7:
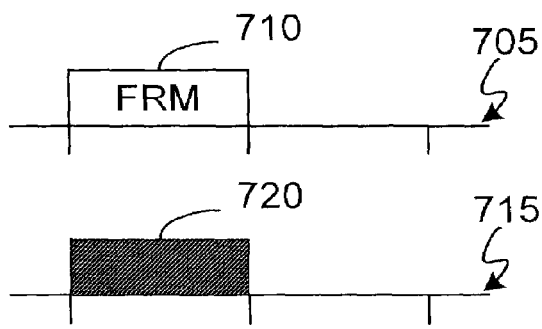
FIG. 7 is a diagram frames transmitted on two FPDCCH channels, according to a preferred embodiment of the present invention.

With reference now to FIG. 7, there is shown a diagram illustrating frames transmitted on two FPDCCH channels 705 and 715, according to a preferred embodiment of the present invention. FIG. 7 displays a one-slot frame 710 being transmitted on FPDCCH channel 705 while it is unclear if there is a frame (highlight 720) on FPDCCH channel 715. The fact that one FPDCCH channel has a one-slot frame (for example, frame 710) while on another FPDCCH channel, it is unclear if the highlight 720 is a frame with a one-slot format. Then, if one completed frame from one of the two FPDCCH channels passes a one-slot format test while the other completed frame fails a one-slot format test, then the probability of the two completed frames having a one-slot format is $p_{one}=(1-p_m)p_d$. If $p_m=1\times10^{-4}$ and $p_d=99\times10^{-2}$, the $p_{one}=98.99\times10^{-2}$ or (0.9899). Also, the probability for the two complete frames being two- or four-slot formatted frames is $p_{two\ or\ four}=(1-p_d)p_m$. Therefore, $p_{two\ or\ four}=1\times10^{-6}$ using the above probabilities. Clearly, $p_{one} \sim p_d$ in this case and the format testing for two- and four-slots can safely be stopped.

The slot number counting and probability techniques can significantly reduce the amount of slot format testing when relative channel quality is high, for example, a high carrier-to-interference ratio (C/I). However, when a mobile station is at the periphery of a base station's coverage area, the channel quality typically drops to such a level that mobile stations may no longer be able to consistently detect the frame slot formats. Therefore, the performance gains achieved by the slot number counting and probability techniques can be lost as the slot format testing can degrade to simply testing every frame for each available format.

However, according to a preferred embodiment of the present invention, the quality of the channel may be used to help reduce the number of slot format tests. In general, when channel quality drops, communications tend to drop to lower bit-rates to help increase the tolerance of the communications to errors. The bit-rates may be reduced by increased use of error detection and/or correction codes, repetitions of the transmitted data, stronger codes, and so forth.

Figure 8A:
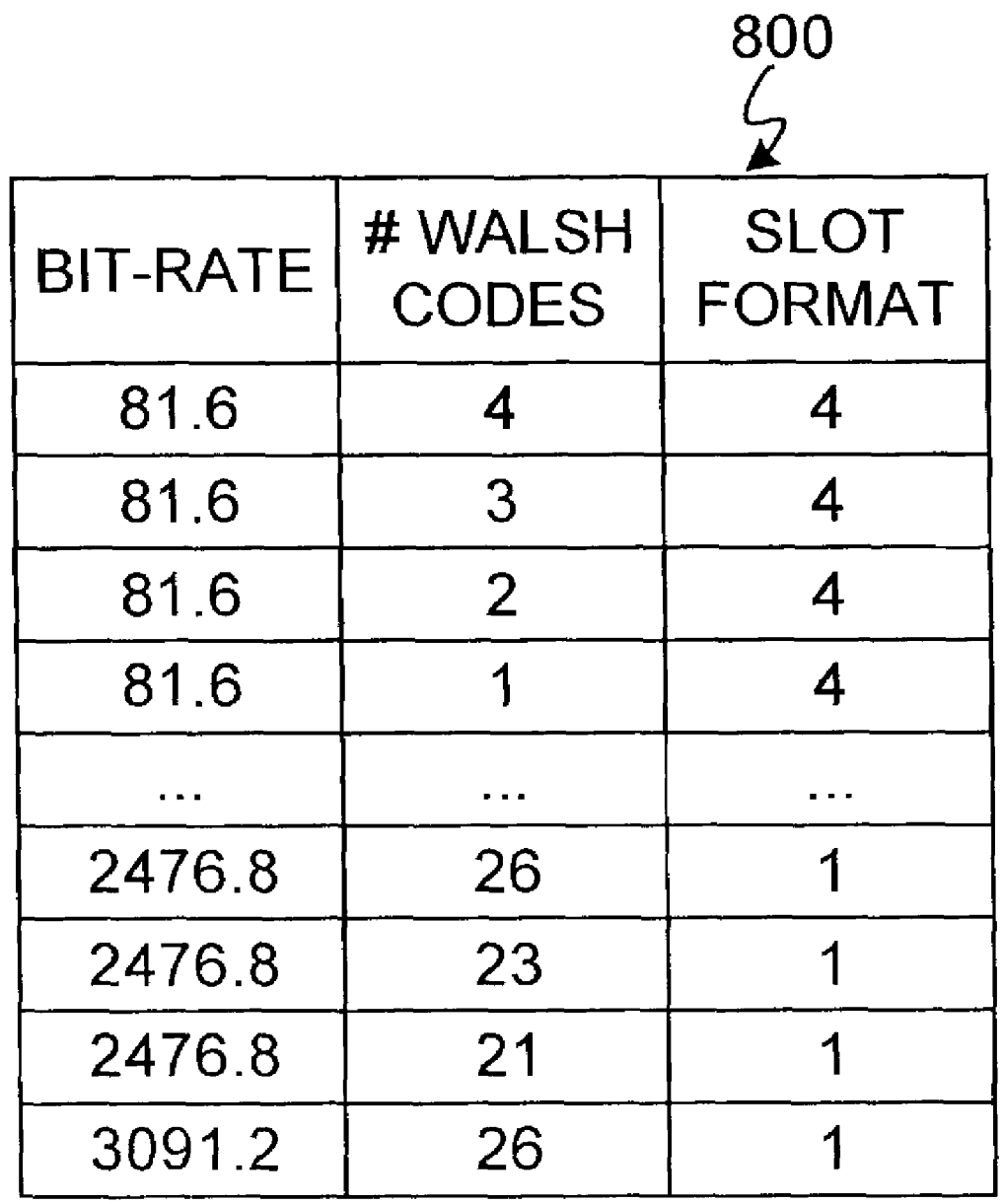
FIG. 8a is a table listing channel bit-rates and slot formats.

With reference now to FIG. 8a, there is shown a table 800 listing channel bit-rates and slot formats for a portion of available data rates and transmission parameters for a CDMA2000 compliant communications system. The table 800 lists some of the top (maximum supported) and the bottom (minimum supported) data rates in a CDMA2000 compliant communications system. With the minimum supported data rates, note that the supported slot format is the four-slot format while the supported slot format for the maximum supported data rates is the one-slot format. Note that for many intermediate formats, all three slot formats are supported. However, for the maximum and minimum data rates, only one slot format is supported.

Figure 8B:
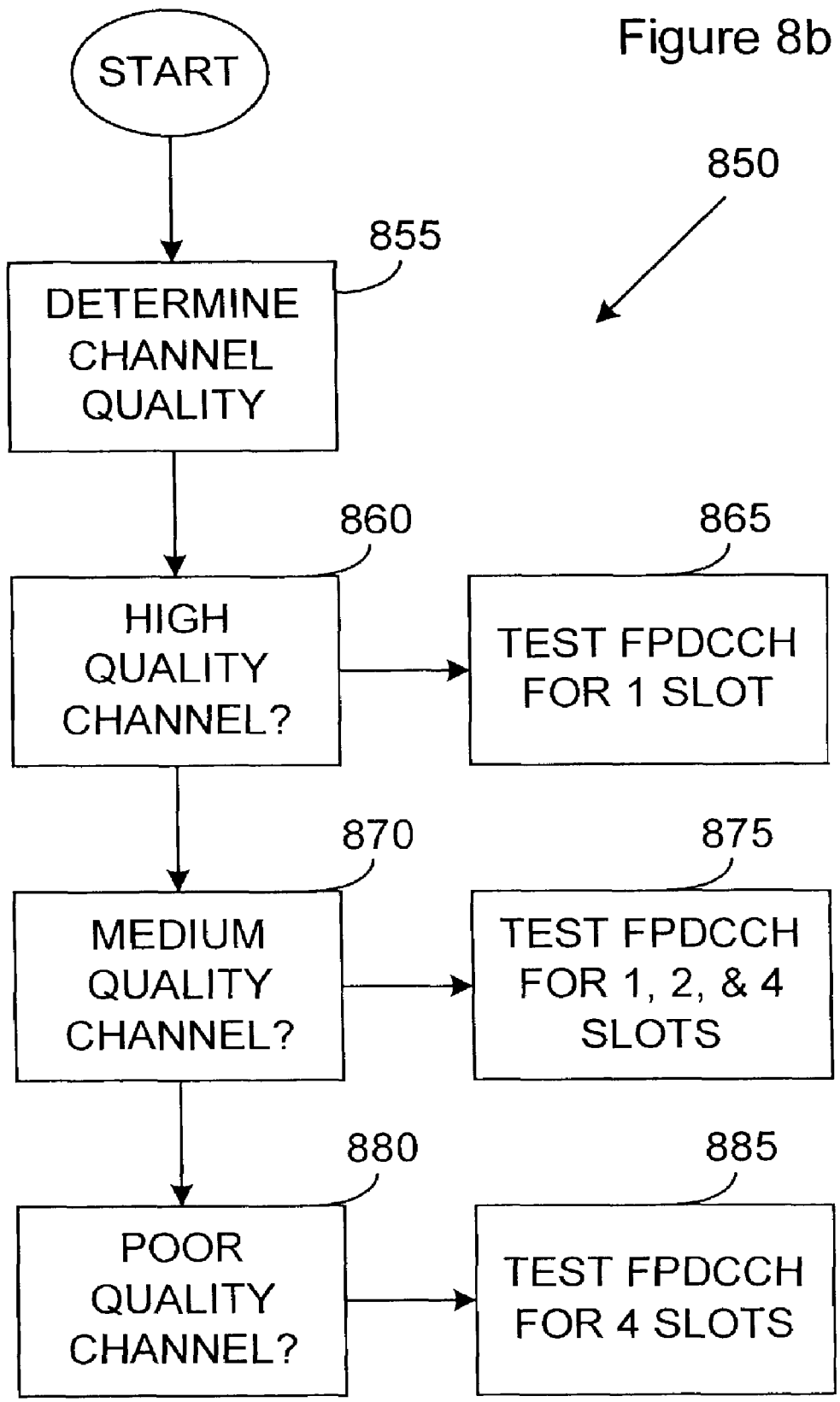
FIG. 8b is a diagram of an algorithm making use of channel quality to help reduce slot format testing, according to a preferred embodiment of the present invention.

With reference now to FIG. 8b, there is shown an algorithm 850 that may be used to help reduce slot format testing based on channel quality, according to a preferred embodiment of the present invention. According to a preferred embodiment of the present invention, the algorithm 850 may execute on a demodulator and decoder. The demodulator and decoder may be a custom design logic unit with an intended use of demodulating and decoding data carried on a communications channel. The demodulator and decoder may also be a software application that is executing on a processing element or a control unit of a mobile station. The demodulator and decoder begin by taking a measurement of the channel quality (block 855). The channel quality may be determined by several different techniques, some as simple as measuring the bit-error rate, the frame-error rate, the packet-error rate, and so forth. More complex channel quality measurements may be performed by calculating values such as the Ec/Io of the channel, wherein Ec is the pilot channel energy accumulated over one PN chip period divided by the total power spectral density of the received bandwidth. Other metrics for channel quality may be as equally effective.

After determining the channel quality, the demodulator and decoder can rate the channel quality as either high (block 860), medium (block 870), or low (block 880) and adjust its slot format test accordingly. If the channel quality is high, then the demodulator and decoder may elect to perform only testing for one-slot formatted transmissions (block 865). While if the channel quality is low, then the demodulator and decoder may only test for four-slot formatted transmissions (block 885). Medium quality channels may require the processing element to test for all possible slot formats (block 875).

Note that the demodulator and decoder may continually (or periodically) determine the channel quality to make its decision regarding the slot formats. Alternatively, the demodulator and decoder may determine the channel quality and make any necessary adjustments if the performance of the mobile station drops below a certain predetermined threshold.

The three techniques discussed above (slot number counting, probability, and channel quality) may be combined to create a single technique that may reduce the number of slot format tests for a wide range of operating conditions. For example, the slot number counting and probability based techniques operate best when channel quality is high. Alternatively, measuring channel quality and using the channel quality operates best when channel quality is high or low. Therefore, by combining the techniques, slot format testing may be reduced for channels of low, medium, or high quality.

Figure 9:
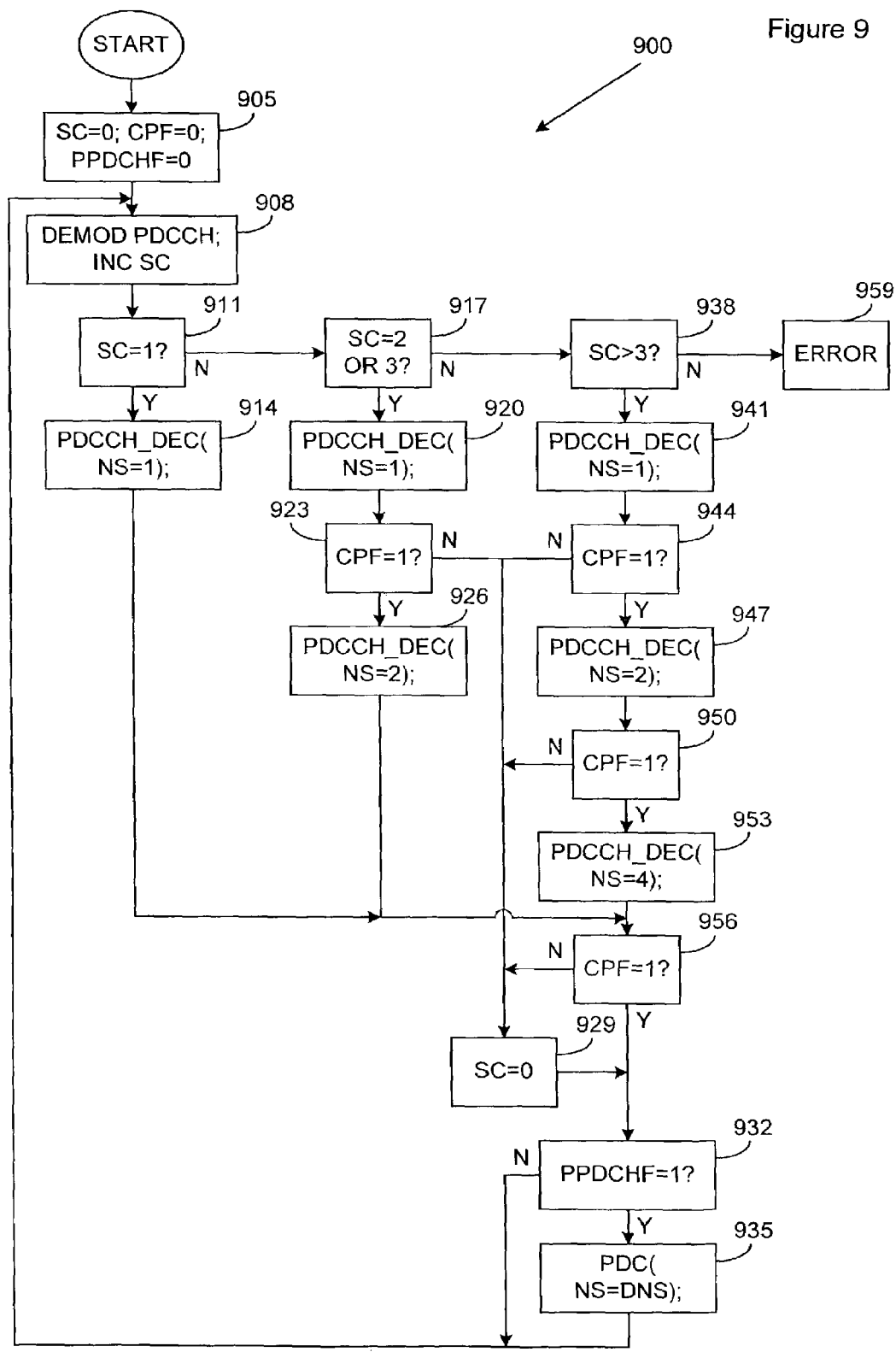
FIG. 9 is a diagram of an algorithm used for slot format testing with reduced slot format testing, according to a preferred embodiment of the present invention.

With reference now to FIG. 9, there is shown a flow diagram illustrating an algorithm 900 used for slot format detecting with reduced slot format testing, according to a preferred embodiment of the present invention. According to a preferred embodiment of the present invention, the algorithm 900 may execute on a demodulator and decoder. The algorithm 900 may be scheduled to wait until it has received an entire FPDCCH frame before checking slot formats. Alternatively, the algorithm 900 may be scheduled to execute continuously, checking the slot formats of data arriving on a FPDCCH.

The demodulator and decoder begin by initializing some variables to an initial value, preferably zero (block 905). The variables being initialized may include: Slot_Counter (SC)—used to count slots received after the last successful decode, Continue_Proc_Flag (CPF)—used as a signal flag to signal continuation of slot format testing, Proc_Packet_Data_Channel_Flag (PPDCHF)—used as a signal flag to signal successful decode of slot format. After initializing the variables in block 905, the demodulator and decoder may demodulate a Forward Packet Data Control Channel (PDCCH) and increment the slot_counter (SC) variable (block 908).

Then, depending on the value of the SC variable, the demodulator and decoder may elect to perform one of several different tasks. In a block 911, the demodulator and decoder checks to see if the SC variable is equal to one (1), while in a block 917, the demodulator and decoder checks to see if the SC variable is equal to two (2) or three (3), a third block 938 checks to see if the SC variable is greater than three (3). If none of these checks are true, then an error may have occurred and the demodulator and decoder asserts an error condition (block 959).

If the SC variable is equal to one (1), then the demodulator and decoder may attempt to decode the PDCCH by executing a PDCCH decoding function (performed via a procedure call PDCCH_DEC) with a parameter of Number_of_Slots (NS) being equal to one (1). The PDCCH decoding function (PDCCH_DEC( )) may be a functional unit within the demodulator and decoder that is expressly designed to decode the PDCCH in a variety of slot formats. Alternatively, the PDCCH decoding function may be a software function executing along side the modulator and decoder in a processing element or control unit.

Figure 10:
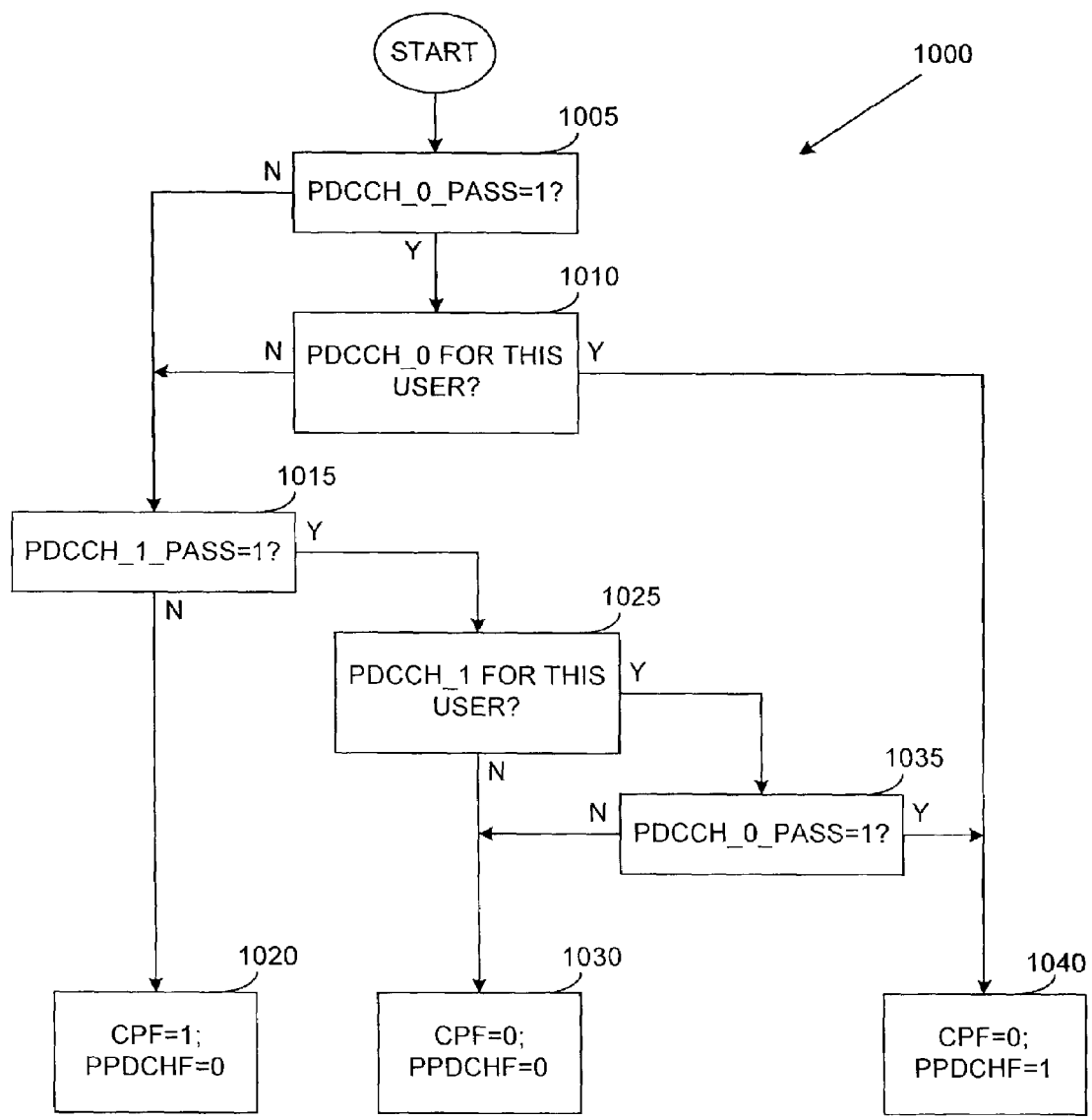
FIG. 10 is a diagram of an algorithm used in PDCCH demodulating, according to a preferred embodiment of the present invention.

With reference now to FIG. 10, there is shown a flow diagram illustrating an algorithm 1000 used in PDCCH demodulating, according to a preferred embodiment of the present invention. According to a preferred embodiment of the present invention, the algorithm 1000 may be used to demodulate a PDCCH based on a parameter Number of Slots (NS) and can be initiated by an algorithm (such as the algorithm 900 (FIG. 9)) that is used for slot format detecting.

The demodulator and decoder may begin by checking a value of a control variable (Packet_Data_Control_CH_0_Pass (PDCCH0P)) (block 1005). The control variable PDCCH0p can be used to keep track if PDCCH_0 (Packet Data Control Channel Zero) has been successfully decoded for the particular NS provided. For example, if PDCCH_0 has not been successfully decoded with the particular NS, then the PDCCH0P can be equal to zero (0).

If PDCCH0P is not equal to one (1) (block 1005), the demodulator and decoder may check the number of times PDCCH_1 has been successfully decoded with the particular NS (block 1015). If PDCCH1P is not equal to one (1) (block 1015), then nothing is really known about the slot format of either PDCCH. For example, since both PDCCH has not been successfully decoded, the slot format is not known. Therefore, the demodulator and decoder may then end the PDCCH decoding by returning two variables, CPF 1 and PPDCHF=0 (block 1020). The variable CPF=1 may indicate that the slot format detecting should continue and the variable PPD-CHF=0 may indicate that the PDCCH was not successfully decoded.

If PDCCH0P is not equal to (1) (block 1005) and if PDCCH1P is equal to one (block 1015), then a situation arises where PDCCH_0 was unsuccessfully decoded with the particular NS while PDCCH_1 was successfully decoded with the particular NS. This situation can be similar to what was discussed in FIG. 7, wherein one PDCCH was successfully decoded while the other was not. Recalling the discussion of FIG. 7, where if one PDCCH was successfully decoded while the other was not, then the probability of both PDCCH having the same slot format was essentially equal to one (1). Therefore, it can be wise to go ahead and assume that both PDCCH are of the same slot format.

The demodulator and decoder can then check to see if the data in PDCCH_1 is intended for the current user (block 1025). If the data is not intended for the current user, then the demodulator and decoder may then end the PDCCH decoding by returning two variables, CPF=0 and PPDCHF=0 (block 1030). The variable CPF=0 may indicate that the slot format has been determined and continued testing may be discontinued and the variable PPDCHF=0 may indicate that the PDCCH was not successfully decoded.

If PDCCH_1 is intended for the current user (block 1025), then the demodulator and decoder may once again test if PDCCH0P may be equal to one (1) (block 1035). This may be thought of as a second attempt to decode the PDCCH_0 channel. Alternatively, the test performed in block 1035 may simply be a check of the results of an actual decoding attempt on the PDCCH_0 channel. If the PDCCH_0 channel cannot be decoded, the demodulator and decoder may move to block 1030 and return two variables CPF=0 and PPDCHF=0. However, if the PDCCH_0 channel can be decoded, then the demodulator and decoder may move to block 1040, wherein the demodulator and decoder may return two variables CPF=0 and PPDCHF=1. The variable CPF=0 may indicate that the slot format has been determined and continued testing may be discontinued and the variable PPDCHF=1 may indicate that the PDCCH has been successfully decoded.

If PDCCH_0 was successfully decoded in block 1005 and if the data in the PDCCH_0 is intended for the current user (block 1010), then the demodulator and decoder may move to block 1040 wherein the demodulator and decoder may return two variables. CPF=0 and PPDCHF=1. The variable CPF=0 may indicate that the slot format has been determined and continued testing may be discontinued and the variable PPD-CHF=1 may indicate that the PDCCH has been successfully decoded.

With reference now back to FIG. 9, after returning from executing the PDCCH decoding function with NS=1 (block 914), the demodulator and decoder can check the results of the decoding by testing the CPF variable (block 956). If the variable CPF=1 (the decoding was unsuccessful), then the demodulator and decoder may check to see if the data in the PDCCH is intended for the current user (block 932). Since the decoding was unsuccessful, the determination of the intended recipient of the data may not be performed. Therefore, the demodulator and decoder can return to block 908 to continue demodulating the PDCCH.

If the SC variable is equal to two (2) or three (3) (block 917), then the demodulator and decoder may attempt to decode the PDCCH as either a single slot format or a dual slot format. First, the demodulator and decoder may attempt to decode the PDCCH as a single slot format by executing the PDCCH decoding function with NS=1 (block 920). When the PDCCH decoding function returns, the demodulator and decoder may check on the success of the decoding function by testing the CPF variable (block 923). If the CPF variable is equal to one (1) then the PDCCH was not in a single slot format and the demodulator and decoder may then attempt to decode the PDCCH as a dual slot format by executing the PDCCH decoding function with NS=2 (block 926).

If the CPF variable is equal not equal to one (1), i.e., the decoding was successful, the demodulator and decoder may the reset the slot counter (block 929) and check to see if the variable PPDCHF=one (1) (the data in the PDCCH is intended for the current user) then the demodulator and decoder can decode the PDCH (block 935). The decoding of the PDCH may take place in a specialized unit or a software subroutine written specifically to decode the data. If the variable PPDCHF is not equal to one (1), then the demodulator and decoder can return to block 908 to continue demodulating the PDCCH.

If the SC variable is greater than three (3) (block 938), then the demodulator and decoder may attempt to decode the PDCCH as either a single slot format, a dual slot format, or a quad slot format. First, the demodulator and decoder may attempt to decode the PDCCH as a single slot format by executing the PDCCH decoding function with NS=1 (block 941). When the PDCCH decoding function returns, the demodulator and decoder may check on the success of the decoding function by testing the CPF variable (block 944). If the CPF variable is equal to one (1) then the PDCCH was not in a single slot format and the demodulator and decoder may then attempt to decode the PDCCH as a dual slot format by executing the PDCCH decoding function with NS=2 (block 947). When the PDCCH decoding function returns, the demodulator and decoder may check on the success of the decoding function by testing the CPF variable (block 950). If the CPF variable is equal to one (1) then the PDCCH was not in a dual slot format and the demodulator and decoder may then attempt to decode the PDCCH as a quad slot format by executing the PDCCH decoding function with NS=4 (block 953).

If the CPF variable is equal not equal to one (1) in any of the tests (blocks 944, 950, or 956), i.e., the decoding was successful, the demodulator and decoder may the reset the slot counter (block 929) and check to see if the variable PPDCHF=one (1) (the data in the PDCCH is intended for the current user), and then if PPDCHF=one (1), the demodulator and decoder can decode the PDCH (block 935). The decoding of the PDCH may take place in a specialized unit or a software subroutine written specifically to decode the data. If the variable PPDCHF is not equal to one (1), then the demodulator and decoder can return to block 908 to continue demodulating the PDCCH.

Note that if the SC variable fails each of the tests comparing it to one (block 911), two or three (block 917), and greater than three (block 938), then an error has occurred in the algorithm 900. The demodulator and decoder may then assert an error condition in block 959. The error condition may require that a resetting of the demodulator and decoder or perhaps even a resetting of the entire mobile unit.

Figure 11:
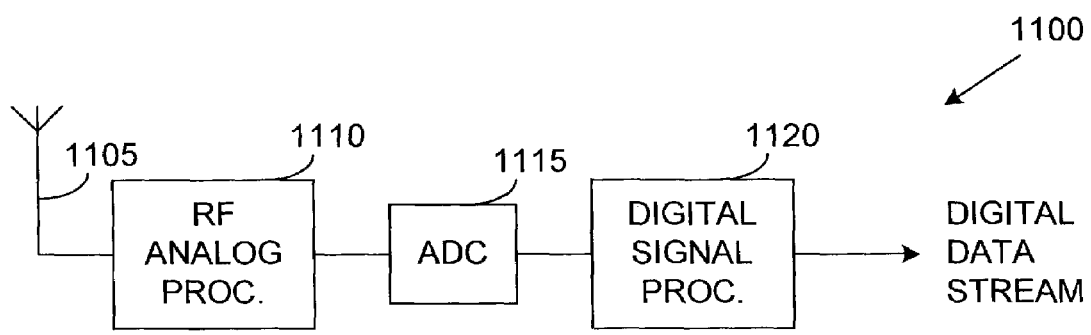
FIG. 11 is a diagram of a portion of a wireless receiver, according to a preferred embodiment of the present invention.

With reference now to FIG. 11, there is shown a diagram illustrating a functional view of a portion of a wireless receiver 1100, according to a preferred embodiment of the present invention. Note that the portion of the wireless receiver 1100 displayed in FIG. 11 may be used to received a transmission and create a digital data stream for use by a remainder of the wireless receiver 1100 and other devices or clients that may be coupled to the wireless receiver 1100.

A signal, transmitted over-the-air, may be received at the wireless receiver 1100 by an antenna 1105. The received signal may then be processed by a radio frequency (RF) analog processing unit 1110. The RF analog processing unit 110 may be responsible for such manipulations to the received signal as signal filtering for purposes of out-of-band noise rejection, channel compensation, signal level amplification, mixing, and so forth. The filtered and amplified received signal may then be converted into a digital symbol stream by an analog-to-digital converter (ADC) 1115. The digital symbol stream can then be presented to a digital signal processing unit 1120 for digital manipulation to produce a digital data stream that may be usable by other devices and clients that are a part of the wireless receiver 1100 or attached to the wireless receiver 1100. Examples of digital manipulation include: digital filtering, digital signal amplification, error detection and correction, channel demodulation, channel decoding, and so forth.

Figure 12:
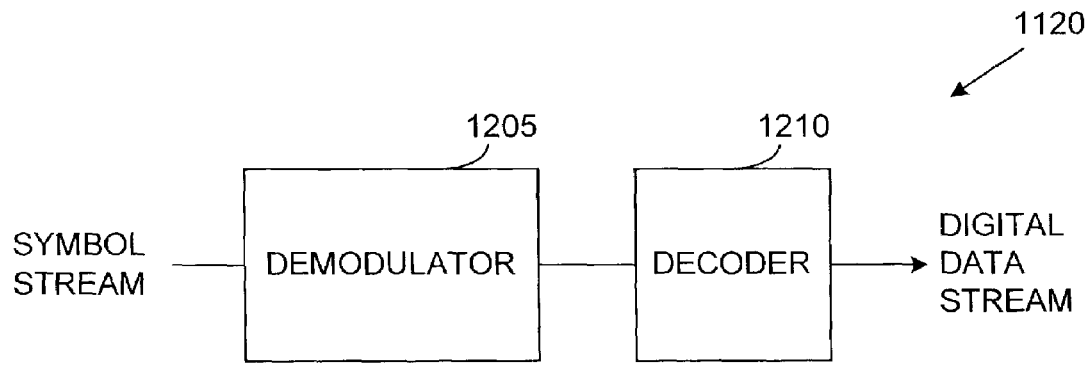
FIG. 12 is a diagram of a portion of a digital signal processing unit of a wireless receiver.

With reference now to FIG. 12, there is shown a diagram illustrating a portion of a digital signal processing unit of a wireless receiver, according to a preferred embodiment of the present invention. According to a preferred embodiment of the present invention, the digital signal processing unit displayed in FIG. 12 may be the digital signal processing unit 1120 (FIG. 11). The digital symbol stream, as one provided by an ADC (such as the ADC 1115 (FIG. 11)), may be demodulated by a demodulator 1205. The demodulator 1205 may be used for operations such as determining a slot transmission format of communications channels such as the PDCCH. Once the demodulator 1205 has successfully demodulated the communications channel(s), a channel decoder 1210 can be used to extract data being carried on the communications channel(s) from the encoded transmissions. The digital data stream produced by the channel decoder 1210 may be provided to other portions of the digital signal processing unit 1120 to be filtered, amplified, error detected and corrected, and so forth.

Figure 13:
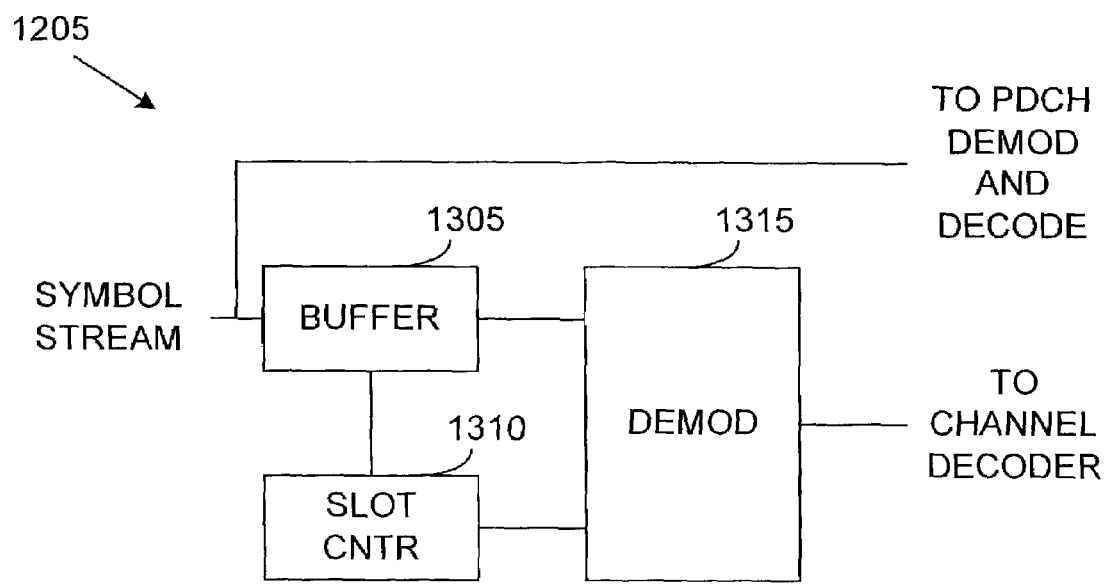
FIG. 13 is a diagram of a demodulator of a wireless receiver, according to a preferred embodiment of the present invention.

With reference now to FIG. 13, there is shown a diagram illustrating a demodulator of a wireless receiver, according to a preferred embodiment of the present invention. According to a preferred embodiment of the present invention, the demodulator displayed in FIG. 13 may be the demodulator 1205 (FIG. 12). A digital symbol stream, such as one provided by the ADC 1115 (FIG. 11), may be provided to a buffer 1305 that may have been specifically designed to hold four slot of data from each of the two PDCCH. The same digital symbol stream may be provided to a PDCH demodulator and decoder (not shown) in order to provide demodulation and decoding of the PDCH. Then, once a slot of data has been received by the buffer 1305, the buffer 1305 may assert a signal flag line to a slot counter 1310. The assertion of the signal flag line may result in the slot counter 1310 incrementing a count of the number of slots since a last successfully demodulated/decoded frame of data.

Both the contents of the buffer 1305 and the slot counter 1310 may be provided to a demodulator 1315. According to a preferred embodiment of the present invention, the demodulator 1315 may attempt to demodulate the contents of the buffer 1305 based on the value provided by the slot counter 1310, such as in a fashion described in FIGS. 6 and 9. If the demodulator 1315 is successful in demodulating the contents of the buffer 1305, the demodulator 1315 can pass the demodulated data to a channel decoder (such as the channel decoder 1210 (FIG. 12)) as well as resetting the count in the slot counter 1310. As discussed previously, the channel decoder may use the data provided by the demodulator 1315 to decode data carried on the PDCH channels.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving one or more frames of data in a sequence of frames; and
   demodulating a first frame of the one or more frames of data based upon a position of the first frame in the sequence of frames, wherein, if the first frame is in a first position demodulating the first frame only as a single slot format frame.

2. The method of claim 1 further comprising:
   if the demodulating of the first frame fails, receiving a second frame of the one or more frames and demodulating the second frame based upon a position of the second frame in the sequence of frames; and
   if the demodulating of the first frame of data succeeds, decoding a third frame of data, the third frame associated with the first frame of data.

3. The method of claim 2, wherein if the demodulating of the first frame of data succeeds, receiving the second frame as a frame of data in the first position.

4. The method of claim 2, wherein the first frame of data is a frame of control channel data and the third frame of data is a frame of data channel data.

5. The method of claim 2, wherein the position of each of the one or more frames of data is monitored at least in part with a frame counter storing a value.

6. The method of claim 5, wherein the demodulating comprises:
   if the value of the frame counter is equal to one,
      i) demodulating the first frame of data as a single slot format frame;
   if the value of the frame counter is equal to two or three,
      ii) demodulating the first frame of data as a single and dual slot format frame; and
   if the value of the frame counter is greater than three;
      iii) demodulating the first frame of data as a single, dual, and quad slot format frame.

7. The method of claim 6, wherein the ii) demodulating comprises:
   1) demodulating the first frame of data as a single slot format frame; and if the 1) demodulating fails,
   2) demodulating the first frame of data as a dual slot format frame.

8. The method of claim 7, wherein the 2) demodulating demodulates the first frame of data and a fourth frame of data, the fourth frame of data having been received immediately prior to the first frame of data.

9. The method of claim 6, wherein the iii) demodulating comprises:
   a) demodulating the first frame of data as a single slot format frame; if the a) demodulating fails,
   b) demodulating the first frame of data as a dual slot format frame; and if the b) demodulating fails, c) demodulating the first frame of data as a quad slot format frame.

10. The method of claim 9, wherein the b) demodulating demodulates the first frame of data and a fourth frame of data, the fourth frame of data having been received immediately prior to the first frame of data and the c) demodulating demodulates the first frame of data and a fifth, sixth, and seventh frame of data, the fifth, sixth, and seventh frames of data having been received sequentially immediately prior to the first frame of data.

11. The method of claim 6, wherein the first frame of data is carried on a first channel and a fourth frame is carried on a second channel and wherein each demodulation of the first frame of data comprises:
demodulating the first frame of data on the first channel;
if the demodulating the first frame of data on the first channel is successful,
testing if the first channel is intended for a current user;
if the first channel is intended for the current user, decoding a fifth frame of data, the fifth frame of data associated with the first frame of data;
if the demodulating the first frame of data on the first channel fails,
demodulating the fourth frame of data on the second channel;
if the demodulating the fourth frame of data on the second channel is successful,
testing if the second channel is intended for the current user;
if the second channel is intended for the current user, again demodulating the first frame of data on the first channel with the same demodulation that was successful in demodulating the fourth frame of data; and
if the demodulating the first channel with the same demodulation that was successful in demodulating the fourth frame is successful, decoding a sixth frame of data, the sixth frame of data associated with the fourth frame of data on the second channel.

12. The method of claim 1, wherein the one or more frames of data are frames of control channel data.

13. The method of claim 12, wherein the one or more frames of control channel data are carried on a pair of forward-link packet data control channels (FPDCCH).

14. The method of claim 1, wherein if the first frame of data is in a second or third position, demodulating the first frame of data as a single and dual slot format frame, and if the first frame of data is in a fourth or larger position, demodulating the frame of data as a single, dual and quad slot format frame.

15. A method for demodulating a control channel, wherein frames of data carried on the control channel may be formatted differently based on channel quality, the method comprising:
determining a channel quality; and
demodulating a frame of data based on the channel quality, wherein
if the channel quality is high,
demodulating the frame of data using a single slot frame format,
if the channel quality is low,
demodulating the frame of data using a quad slot frame format, and
if the channel quality is medium,
demodulating the frame of data using a single, dual, and quad slot frame format.

16. The method of claim 15, wherein a frame of data on the control channel is associated with a frame of data on a data channel, and the method further comprises decoding a frame of data on the data channel associated with the frame of data on the control channel if the demodulation of the frame of data on the control channel succeeds.

17. The method of claim 15, wherein the channel quality is periodically determined.

18. The method of claim 15, wherein the channel quality is determined when performance of a device receiving the frames of data degrades below a predetermined threshold.

19. A circuit comprising:
a buffer to hold a frame of data from a symbol stream;
a frame counter coupled to the buffer, the frame counter to count the number of frames of data held by the buffer since a last successfully demodulated frame of data; and
a demodulator coupled to the buffer and the frame counter, the demodulator containing circuitry to demodulate a frame of data using based on the count from the frame counter.

20. The circuit of claim 19, wherein the buffer holds a frame of data from two control channels.

21. The circuit of claim 19, wherein the buffer holds a number of frames of data at least equal to a longest supported slot format.

22. A wireless receiver comprising:
a radio frequency (RF) processing unit coupled to a signal input, the RF processing unit containing circuitry to filter, amplify, and mix a signal provided by the signal input;
an analog-to-digital converter (ADC) coupled to the RF processing unit, the ADC to convert the filtered, amplified, and mixed signal provided by the RF processing unit into a digital symbol stream; and
a digital signal processing unit coupled to the ADC, the digital signal processing unit containing circuitry to demodulate a frame of control data based on a count of a number of frames of control data received since a last successfully demodulated frame of control data and to decode a frame of data based on the demodulated frame of control data.

23. The wireless receiver of claim 22, wherein the digital signal processing unit comprises:
a demodulator coupled to the ADC, the demodulator comprising,
a buffer to hold the frame of control data;
a frame counter coupled to the buffer, the frame counter to count the number of frame of control data held by the buffer since a last successfully demodulated frame of control data;
a demodulator coupled to the buffer and the frame counter, the demodulator containing circuitry to demodulate a frame of data using based on the count from the frame counter; and
a decoder coupled to the demodulator, the decoder containing circuitry to decode the frame of data based on the demodulated frame of control data.

24. The wireless receiver of claim 22, wherein the wireless receiver is part of a wireless device operating in wireless communications network.

25. The wireless receiver of claim 24, wherein the wireless communications network is a code-division multiple access (CDMA) compliant network.

26. The wireless receiver of claim 25, wherein the CDMA compliant network is CDMA2000 compliant.

27. The wireless receiver of claim 25, wherein the CDMA compliant network is Universal Mobile Telephone System (UMTS) compliant.

* * * * *